Figure 1:
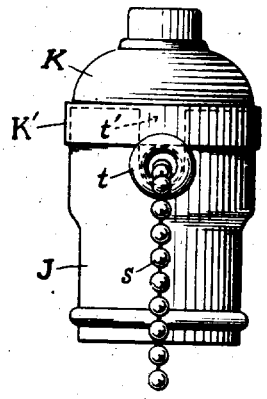

F. BARR.

PULL SOCKET FOR ELECTRIC SWITCHES.

APPLICATION FILED JUNE 29, 1911.

Reissued Oct. 31, 1911.

13,301.

2 SHEETS—SHEET 1.

WITNESSES

E. Bradford

A. P. Boulter

INVENTOR

Frederic Barr,

ATTORNEY

F. BARR.

PULL SOCKET FOR ELECTRIC SWITCHES.

APPLICATION FILED JUNE 29, 1911.

Reissued Oct. 31, 1911.

13,301.

2 SHEETS—SHEET 2.

WITNESSES

E. Bradford

A. C. Geeler

INVENTOR

Frederic Barr,

R. B. Smith

ATTORNEY

UNITED STATES PATENT OFFICE

FREDERIC BARR, OF NEW YORK, N. Y.

PULL-SOCKET FOR ELECTRIC SWITCHES.

13,301. Specification of Reissued Letters Patent. Reissued Oct. 31, 1911.

Original No. 958,988, dated May 24, 1910, Serial No. 527,614. Application for reissue filed June 29, 1911. Serial No. 636,114.

*To all whom it may concern:*

Be it known that I, FREDERIC BARR, a citizen of the United States, residing in the borough of Brooklyn, city of New York, State of New York, have invented certain new and useful Improvements in Pull-Sockets for Electric Switches, fully described and represented in the following specification and the accompanying drawings, forming a part of the same.

This invention relates to pull-switches for the sockets of electric incandescent lamps, and it consists of various details of construction which will be understood from the drawing and the following description.

Figure 2:
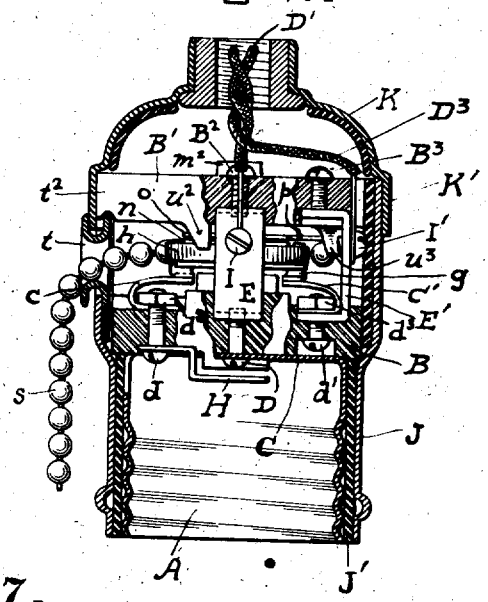
Figure 4:
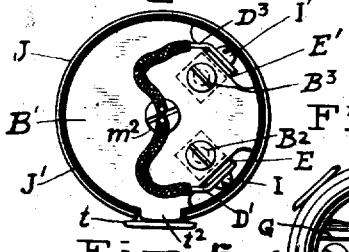
Figure 7:
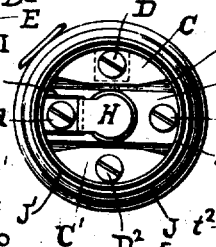
Figure 3:
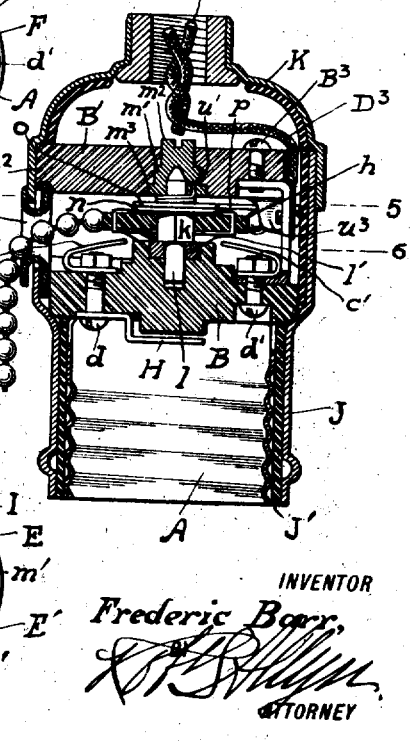
Figure 5:
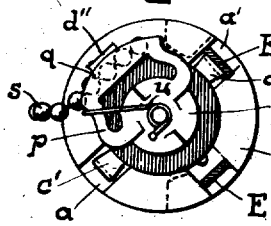
Figure 6:
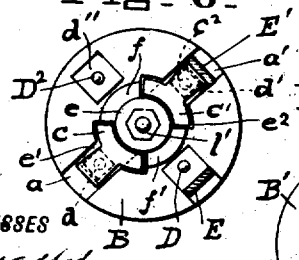
Figure 8:
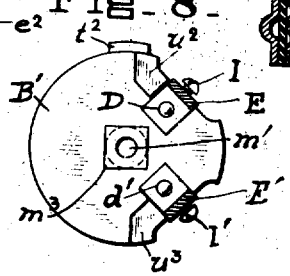
Figure 9:
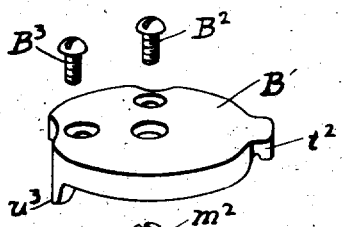
Figure 10:
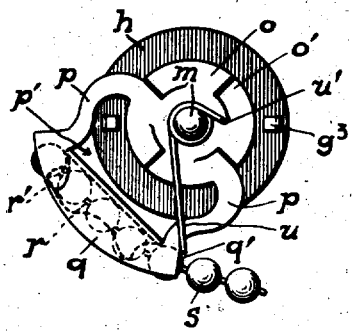
Figure 10:
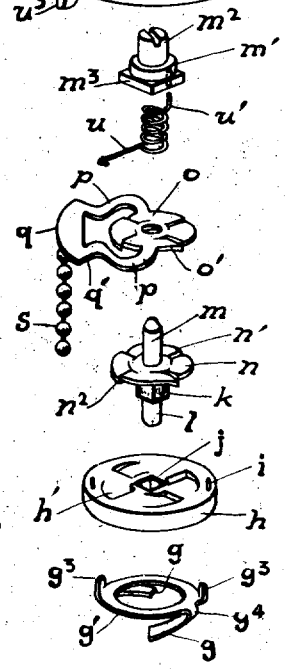
Figure 12:
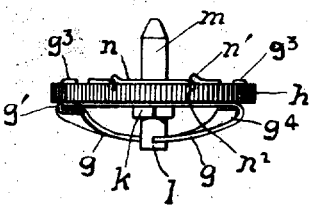
Figure 13:
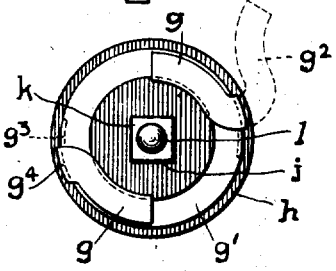
Figure 11:
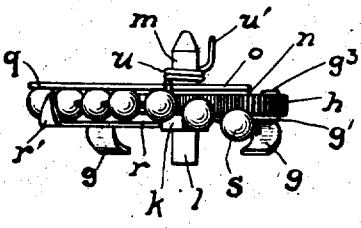
Figure 14:
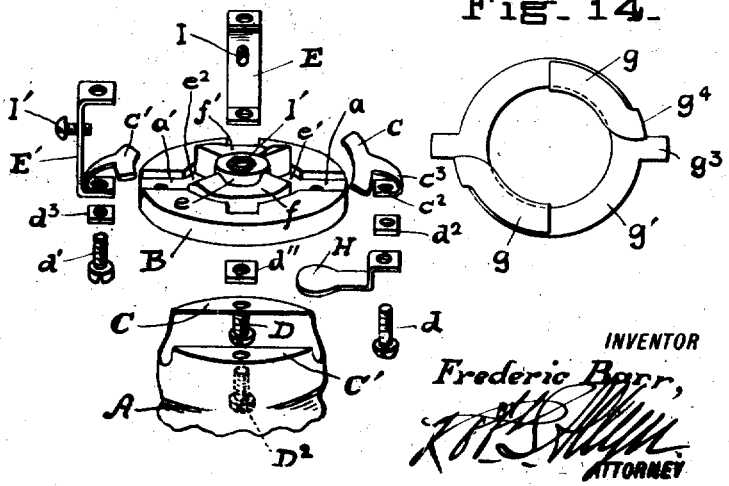

Figure 1, is a front elevation of a socket embodying the improvements of my invention. Fig. 2, is a section of the shell and a view of the interior, parts of the porcelain supporting blocks being shown in section so as to illustrate electrical connections. Fig. 3, is a vertical section of the complete construction. Fig. 4, is a plan view showing the circuit terminals, the cap of the shell being omitted. Fig. 5, is a horizontal section and plan on the plane of the line 5, 5 of Fig. 3. Fig. 6, is a horizontal section and plan on the plane of the line 6, 6 of Fig. 3. Fig. 7, is a view of the under side of the socket showing the lamp terminals. Fig. 8, is a view of the under side of the upper porcelain with the connecting posts in section. Fig. 9, is a dropped perspective view showing the separate parts of the mechanism. Fig. 10, is a plan view of the oscillating operating member and insulating disk which carries the rotating switch member. Fig. 11, is a side view of the parts shown in Fig. 10. Fig. 12, is a side view of the rotating switch member and its insulating carrier and spindle. Fig. 13, is a view of the under side of the rotating switch member and its insulating carrier and showing in dotted lines one of the switch arms before it is bent into place. Fig. 14, is a view of the under side of the rotating switch member showing the lugs for attaching it to the insulating carrier before being bent up to attach the switch member to the carrier.

A designates the screw socket into which the shank of the lamp is screwed; B the porcelain insulating bed to which the same is attached by flanges C, C′ and screws D, $D^2$ which screws engage with the feet of posts E, E′ having direct connections by screws I, I′ with the circuit conductors $D^1$, $D^3$ (Fig. 2).

The under side of the bed B is provided with a projection F which extends between the flanges C, C′ and screws D, $D^2$ to keep the lamp-shank from contact therewith, and a recess G is formed in one end of such projection to receive the foot of a spring-tongue forming a central lamp contact H which extends over the middle of the projection to press elastically on the center contact on the shank of the lamp, (not shown).

The upper side of the bed B as shown in Fig. 6 is formed with two recesses $a$, $a'$ in which the feet $c^2$ of segmental switch-springs $c$, $c'$ are fitted and secured by screws $d$, $d'$ and nuts $d^2$ and $d^3$. The head of the screw $d$ presses upon the foot of the spring-tongue H, thus making an electric connection between such tongue and the switch-spring $c$. Screw $D^2$ has a nut $d''$ in a recess in the upper part of the base B.

The upper side of the porcelain bed is provided with a raised boss $e$ having two segmental porcelain seats $f$, $f'$ at opposite sides intermediate to the segments of the springs $c$, $c'$. Segmental recesses $e'$, $e^2$ are formed beneath the segmental springs $c$, $c'$, to permit of their depression, when pressed by the movable contact leaves.

The foot of post E′ is clamped beneath the foot of the spring $c'$ and provided with the screw I′ for connection to one of the circuit conductors $D^3$. Post E is fitted to a recess upon the bed-piece B at 90 degrees from the post E′, and has a screw I to clamp the conductor D′. The posts sustain a porcelain head-piece B′ which is clamped to the tops of the posts by screws $B^2$ and $B^3$.

When the lamp is in the screw-socket A, an electrical connection of the springs $c$ and $c'$ closes the circuit between the posts E and E′ through the socket A and the spring-tongue H. Such electrical connection is furnished by a ring $g'$ with leaf-springs $g$ attached to an insulating disk $h$. The spring-leaves are formed integral with the sheet-metal ring or plate $g'$, by cutting them out therewith in the form indicated by the dotted lines $g^2$ at the right hand side of Fig. 13. Each leaf is thus attached to the ring $g'$ by a foot or stem $g^4$, and is reflexed under such ring, as shown in Fig. 12 which forms a very elastic construction. The sheet-metal ring is also formed as shown in Fig. 8 with two integral prongs $g^3$ which are provided to be bent at right angles to the plane of the ring and inserted through slots $i$ in the disk $h$ as shown in Fig. 9, their ends being clenched upon the upper side of the disk and thus holding the ring and leaf-springs $g$ firmly to the disk, as shown in Figs. 3 and 10. The insulating disk is formed as shown in Figs. 9 and 13 with a square hole $j$ in the center, and a spindle is formed as shown in Fig. 3 with a square body $k$ to fit such hole and pivots $l$ and $m$ upon its lower and upper ends.

The bed-piece B is provided with a step-bearing $l'$ for the pivot $l$ and the head-piece B′ with a rotatable bearing $m'$ for the pivot $m$. A ratchet-disk $n$ having four radial slits, with the adjacent edges $n^2$, $n'$, bent downwardly and upwardly (as shown in Figs. 9 and 12) is attached rigidly to the spindle at the upper end of the square body $k$, see Fig. 3, and the insulating disk is fitted to the spindle body just beneath the ratchet disk and has four shouldered indentations $h'$ in its upper surface to receive the downwardly bent tongues $n^2$ upon the ratchet-disk. The said tongues contact with the shoulders $h'$ and propel the disk $h$ positively when the ratchet-disk is rotated; thus supplementing the shoulder connection between $k$ and $j$ and avoiding any wear of the hole $j$ in the disk $h$. The disk $h$ has the leaf-springs $g$ extended from its lower side sufficiently to contact with the segmental switch-springs $c$, $c'$, when the pivot $l$ of the spindle is fitted in the socket $l'$ within the boss $e$. The means for intermittingly moving the disk to bring the spring-leaves $g$ over the switch-springs $c$, $c'$, consists of the so-called cord-lever or operating member formed of sheet-metal integral with a toothed disk $o$ which is fitted movably to the pivot $m$ and lies upon the top of the ratchet-disk $n$. The toothed disk $o$ has four teeth or tongues $o'$ bent downwardly to engage the upwardly bent tongues $n'$ upon the ratchet-disk $n$, and has the cord-lever connected to it by integral arms $p$, $p$ which have an integral segment $q$ at their outer ends. The space $p'$ between the arms and the segment $q$ is stamped out into a flange $r$ which is folded downwardly and outwardly (as shown in Figs. 9, 10 and 11) to form a channel in which a cord or chain $s$ may be fitted. The metal at one end of the flange $r$ is formed with a pointed tongue $r'$ to clamp the end of the cord $s$ in the channel which is formed by the bent flange $r$ and the cord is extended through an eyelet in the casing J of the lamp-socket to operate the switch as is usual. The shoulders at the ends $q'$ of the segment $q$ are adapted to contact with porcelain lugs $u^2$, $u^3$ on the head B′ next to the posts E and E′ in opposite positions of the toothed-disk $o$, one of the shoulders $q'$ being held normally against the lug $u^3$, next to the post E′ by a spiral spring $u$ fitted to the pivot $m$ and having one of its ends extended into contact with the shoulder $q'$, and the other end $u'$ bent upwardly and fitted to a hole in the bearing $m'$. The lugs $u^2$, $u^3$ prevent the cord-lever from touching the posts. This prevents electrical connection.

The pull-cord is guided in its pulling movements by the flanged eyelet $t$ which is fitted loosely to a slot $t'$ in the upper end of the casing J, the casing having the usual cap K with cup-flange K′ which fits over the top of the casing J, and closes the slot $t'$ while it also holds the eyelet from displacement in the lower end of the slot. The slot is made of such depth that the eyelet stands in a line with the channel which is in the periphery of the cord-lever below the segmental-plate $q$.

The porcelain head-piece B′ is formed as shown in Figs. 4 and 9 with a lug $t^2$ which fits in the upper part of the slot $t'$ and thus holds the switch-mechanism in the right relation to the eyelet.

J′ is an insulating shell within the casing.

Means is provided for winding up the coils of the spring $u$ when the parts are first assembled to give the spring the proper tension. This is effected by rotating the bearing $m'$ in the head-piece B′, and locking it therein when properly adjusted. A shank $m^2$ is projected upward from the bearing through the top of the head-piece and notched to receive a screwdriver and a square flange $m^3$ is formed upon the lower end of the bearing and fitted to a shallow square recess in the bottom of the head-piece. The pivot $m$ is of such length as to hold the bearing with the flange $m^3$ in the square recess when the head-piece is clamped upon the posts by the screws $B^2$, $B^3$ but a sufficient loosening of the screws $B^2$ $B^3$ permits the lifting of the head-piece B′ sufficiently to clear the square flange $m^3$ of the bearing, and the bearing may then be turned by a screwdriver and the head-piece then pushed down into contact with tops of the posts when the spring is properly adjusted, which reëngages the flange $m^3$ with the head-piece and holds the spring as adjusted. With sufficient play in the spring switch arms the bearing $m'$ may be depressed sufficiently for the flange $m^3$ to clear the recess in the porcelain B′ and permit the bearing to be rotated without loosening the screws $B^2$, $B^3$.

The action of the ratchet-mechanism for turning the spring-leaves alternately into contact and out of contact with the switch-springs $c$, $c'$, is well known; the chain $s$ operating when pulled, to turn the insulating-disk a quarter of a revolution, and thus alternately bringing the spring-leaves $g$ over the switch-springs $c$, $c'$ or between the same, and thereby operating to light or extinguish the lamp.

The invention consists in the details of construction which secure facility of manufacture and effective operation. The switch-springs $c$ and $c'$, which make and break the circuit are both of them reflexed from the feet $c^2$ by which they are attached, and thus possess great flexibility which enables them to retain their resilience for a long time in operation and thus make an equally perfect contact at all times. The spring-segments $c$ are connected with their feet by narrow legs $c^3$, which render the spring-segments more yielding. The reflexing of the leaf-springs $g$ over the ring $g'$ also makes them more yielding. The formation of the leaf-springs $g$ in one piece with a complete ring of sheet-metal $g'$ furnishes a very strong and permanent attachment of these leaves to the plate portion $g'$, while the integral tongues $g^3$ form a very cheap and effective means of securing the ring to the disk.

By the use of the two switch contacts $c$ and $c'$ and the metal ring $g'$ with contact arms $g$, $g$ I am enabled to obtain a double make and break and greatly increase the carrying capacity of the socket without danger of short circuiting.

It is essential that the upwardly projecting tongues $n'$ upon the ratchet-disk $n$ should maintain accurately their relation to the leaf-springs $g$, so as to set the same accurately in the desired positions when the chain is pulled, and the shoulder $q'$ upon the chain-lever contacts with the lugs $u^2$ and $u^3$. Such an accurate adjustment of the ratchet-disk $n$ to the leaf-springs $g$ is secured partly by making the insulating disk $h$ with a square hole $j$ and forming the pivot with a square body $k$ to fit such hole and making the ratchet $n$ integral with the spindle as by riveting or soldering it thereon; also by making the tongues $n^2$ upon the disk $n$ to contact with shoulders $h'$ on the insulating disk. The formation of the chain-lever in one piece with the ratchet-disk $o$ maintains a fixed relation between these parts, while the punching of the sheet-metal out of the space $p'$ furnishes a flange $r$ of sheet-metal by which a channel is formed to sustain the chain in its operative position, and a prong $r'$ to lock the end of the chain in such channel; all these parts being readily and cheaply formed of the same piece of sheet-metal, within the margin of the segment $p$.

What I claim is:—

1. In a pull-switch for a lamp socket, the combination, with the insulating-bed B carrying a screw-shell and central lamp-contact and having a boss $e$ with segmental switch-segments at its opposite sides electrically connected as set forth, of a rotatable spindle pivoted upon the boss and having a ratchet-disk attached thereto and provided with downwardly and upwardly projecting tongues $n'$ and $n^2$; an insulating disk fitted to the spindle below the ratchet-disk and having recesses with shoulders $h'$ to engage the tongues $n^2$ on the ratchet-disk, the insulating disk having upon its under side leaf-springs $g$ mounted at opposite sides of the spindle to contact with the switch-segments and means for intermittingly turning the ratchet-disk by a pull-cord.

2. In a pull-switch for a lamp socket, the combination, with the insulating bed B carrying a screw-shell and central lamp contact and having a boss $e$ with recesses at its opposite sides, of the switch-segments having feet secured in the recesses and electrically connected as set forth, and having necks $c^3$ reflexed over the feet and provided respectively with segments adjacent to the opposite sides of the boss, and a pull-cord with means for electrically connecting the segments.

3. In a pull-switch for a lamp socket, the combination with the insulating-bed B carrying a screw-shell and central lamp contact and having a boss $e$ with switch-segments $c$, $c'$, at its opposite sides electrically connected as set forth, of a rotatable spindle having a square body with a ratchet-disk $n$ attached to such body and having pivots at its opposite ends, a bearing in the boss to receive the lower pivot of the spindle, an insulating disk having a square hole fitted to the square body, the ring $g'$ having prongs $g^3$ securing it to the under side of the insulating disk, and provided at opposite sides of the spindle with the reflexed leaf-springs $g$ to contact with the segments $c$, $c'$, and means operated by a pull-cord for intermittingly turning the spindle by means of the ratchet disk.

4. In a pull-switch for a lamp socket, the combination, with an insulating-bed B carrying a screw-shell and a central lamp contact and having upon its upper side a central boss with a spindle-bearing fitted therein and switch contacts at opposite sides of the said boss, of a spindle rotatable in the said bearing and having an insulating disk secured thereon and provided upon its under side with leaf-springs adapted to electrically connect the switch-contacts, a ratchet disk movable with the spindle, a toothed-disk $o$ fitted to turn upon the spindle in contact with the ratchet disk and having a cord-lever-segment integrally connected to such toothed-disk by arms with the metal between the arms bent downward and outward into a flange to form a channel for a cord, such flange having a tongue $r'$ clamped upon the end of the pull-cord in the channel, and a spring operating to move the toothed-disk in opposition to the cord.

5. In a pull-switch for a lamp socket, the combination with the insulating-bed B having a central boss with a spindle-bearing fitted therein and having switch-segments at opposite sides of such boss, of a head-piece B′ having a rotatably adjustable bearing in the center and posts connecting the head-piece to the bed B, a rotatable spindle fitted to the said bearings and having thereon an insulating disk with leaf-springs attached to connect the switch segments, a ratchet disk secured to the spindle, a toothed-disk fitted movably to the spindle to engage the ratchet disk, a cord-lever extended from the toothed-disk with cord for moving the same, the rotatable bearing in the head-piece having a locking flange upon such bearing engaging a recess in the bottom of the head-piece, a spiral spring having its coils upon the spindle and its ends engaged respectively with the cord-lever and with the rotatable bearing, and means for turning the bearing to adjust it upon the head-piece when the head-piece is loosened from its posts.

6. In a pull socket switch, an insulating base, a spindle supported thereby, a pair of oppositely disposed segmental switch contacts arranged on opposite sides of said spindle and insulated therefrom and from each other, insulating seats arranged between said switch contacts, an insulating disk rotatably carried by said spindle, a switch member carried by said insulating disk and having bent spring switch arms adapted to simultaneously electrically connect said switch contacts when in engagement therewith and adapted to be insulated from said switch contacts when engaging said insulating seats, terminals electrically connected with said segmental switch contacts and insulated from said switch member, an oscillating member having ratchet teeth for rotating said insulating disk and said switch member step by step to alternately make and break the circuit at two points at each oscillation respectively, a spring normally holding said oscillating member under pressure in one direction, a shell inclosing said parts and an operating chain passing through said shell and connected to said oscillating member by means of which said oscillating member may be moved in one direction against the pressure of said spring, said spring being adapted to return said oscillating member when the operating chain is released.

7. In an electric lamp socket, a base of insulating material, a circuit terminal, a lamp terminal and a screw connecting said circuit terminal and said lamp terminal to said base, a second circuit terminal, a switch contact and a screw connecting said second circuit terminal and said switch contact to said base, a second switch contact, a second lamp terminal and a screw connecting said second switch contact and said second lamp terminal to said base, a switch member having two electrically connected contact arms electrically insulated from both of said switch contacts when the switch member is in one position but adapted to simultaneously make electrical contact with both of said switch contacts when in another position and means for rotating said switch member to bring said arms simultaneously into electrical contact with said switch contacts.

8. In an electric lamp socket, the combination of an insulating base, a spindle mounted therein, two lamp terminals secured to said base at one face thereof, two oppositely arranged stationary switch contacts secured to said base at another face thereof on opposite sides of said spindle, said base having nonconducting seats arranged between said contacts, two circuit terminals, one of said circuit terminals being connected to one of said lamp terminals and the other circuit terminal being connected to one of said switch contacts, the other switch contact being connected to the other lamp terminal, a rotatable switch member on said spindle having two arms adapted to make and break circuit across said stationary switch contacts at two points and means for rotating said switch member.

9. In an electric lamp socket, two porcelain members, two lamp terminals and two switch contacts carried thereby, one of said contacts being connected to one of said lamp terminals, two circuit terminals connected respectively to the other contact and the other lamp terminal, a spindle supported between said porcelain members and a switch member rotatably carried by said spindle and having two arms electrically insulated from both of said switch contacts when the switch member is in one position but adapted to simultaneously electrically connect said switch contacts and alternately make and break the lamp circuit at two points as the switch member is rotated and an oscillating member for rotating said switch member step by step.

10. In an electric lamp socket, a base, two lamp terminals and two switch contacts carried thereby, one of said lamp terminals being connected to one of said switch contacts, a circuit terminal connected to the other lamp terminal, a second circuit terminal connected to the other switch contact, a rotatable switch member having two arms electrically insulated from both of said switch contacts when the switch member is in one position but adapted to simultaneously electrically connect said switch contacts and alternately make and break the lamp circuit at two points as the switch member is rotated and an insulating member for rotating said switch member step by step.

11. In an electric switch, one or more stationary switch contacts and a rotatable switch member consisting of a continuous ring and spring contact arms integral therewith cut from metal outside thereof and reflexed beneath the ring and connected thereto by bent portions.

12. In an electric switch, two oppositely positioned spring switch contacts and a rotatable switch member consisting of a continuous ring and spring contact arms integral therewith cut from metal outside thereof and reflexed beneath the ring and connected thereto by bent portions.

13. In an electric switch, a switch contact member comprising a plate portion and spring arms cut from metal outside the plate portion and reflexed beneath the plate portion and integrally connected therewith by bent portions $g^4$ extending circumferentially and out of the plane of the plate portion.

14. In an electric switch, a rotatable insulating disk, a switch member carried thereby and rotatable therewith and consisting of a plate portion laid against the disk and spring arms cut from metal outside the plate portion and reflexed beneath the plate portion and integrally connected with the plate portion by bent portions $g^4$ extending circumferentially thereof.

15. In a pull socket switch, a porcelain base, a stationary switch contact carried thereby, a rotatable insulating disk of substantial thickness, a switch member carried by said disk and having spring arms beneath the same for engaging said switch contact, an oscillating operating member mounted concentrically with said disk for rotating said disk step by step, a lug projecting from said operating member beyond the periphery of said disk and an operating chain secured to said lug and extending partially around the periphery of said insulating disk.

16. In a pull socket switch, a rotatable switch member, an oscillating operating member having an arm formed of sheet metal with a portion inside of the outer edge stamped out and bent downward and outward to form a lug, the outer edge of the arm forming a flange projecting beyond the lug and an operating chain secured to said lug beneath said flange.

17. In a pull socket switch, upper and lower porcelain blocks, a bracket spacing said blocks apart and having feet, screws fastening said feet to said blocks, a segmental switch contact member having a foot reflexed beneath the contact portion and secured to one foot of said bracket and the contact portion extending laterally on each side of the foot portion, and a rotatable switch member for coacting with said segmental switch contact member.

18. In a pull socket switch, a porcelain base, a pair of oppositely disposed segmental switch contacts, a lamp terminal connected to one contact and a circuit terminal connected to the other contact, a second circuit terminal and a second lamp terminal connected thereto, a rotatable switch member mounted between said switch contacts for making and breaking the lamp circuit at two points, an oscillable operating member insulated therefrom and insulating stops to limit the movement of the operating member.

19. In a pull socket switch, a pair of oppositely disposed switch contacts electrically insulated from each other, a pair of circuit terminals electrically insulated from each other, a lamp terminal electrically connected with one of said switch contacts and a second lamp terminal electrically connected with one of said circuit terminals, a spindle located between said switch contacts, a rotatable switch member mounted on said spindle and insulated from said switch contacts and from said circuit terminals and from said lamp terminals and an operating member insulated from said switch member and adapted to rotate said switch member to simultaneously electrically connect said switch contacts.

20. In an electric pull socket switch, a porcelain base, two lamp terminals, two circuit terminals, two switch contacts, one of said switch contacts having a foot reflexed beneath its contact portion and connected to one of said lamp terminals, the other lamp terminal being connected to one circuit terminal and the other contact being connected to the other circuit terminal, a rotatable switch member for making and breaking the lamp circuit across the switch contacts at two points and an oscillable operating member coacting with said switch member.

21. In a lamp socket switch, an insulating base, two lamp terminals secured thereto at the lower face thereof, two segmental switch contacts secured to said base at the upper face thereof, a rotatable spindle located between said contacts, an insulating member carried by said spindle, a switch member carried by said insulating member and having two arms for making and breaking the circuit across said contacts at two points.

22. In a lamp socket switch, an insulating base, two lamp terminals secured thereto at the lower face thereof, two segmental switch contacts secured to said base at the upper face thereof, a rotatable spindle located between said contacts, an insulating member carried by said spindle, a switch member carried by said insulating member and having two arms for making and breaking the circuit across said contacts at two points and an oscillating operating lever insulated from said switch member.

23. In a pull socket switch, two porcelain blocks, a spindle mounted between said blocks, two switch contacts carried by the lower block on opposite sides of said spindle, a rotatable switch member mounted on said spindle but insulated therefrom, an operating lever mounted to oscillate on said spindle and rotate said switch member step by step and insulating stops carried by the upper block to limit the oscillation of said lever.

FREDERIC BARR.

Witnesses:
R. S. ALLYN,
E. BRADFORD.